US006904522B1

(12) United States Patent
Benardeau et al.

(10) Patent No.: US 6,904,522 B1
(45) Date of Patent: Jun. 7, 2005

(54) METHOD AND APPARATUS FOR SECURE COMMUNICATION OF INFORMATION BETWEEN A PLURALITY OF DIGITAL AUDIOVISUAL DEVICES

(75) Inventors: Christian Benardeau, Bussy Saint Georges (FR); Jean-Luc Dauvois, Paris (FR)

(73) Assignee: Canal+ Technologies, Paris (FR)

( * ) Notice: Subject to any disclaimer, the term of this patent is extended or adjusted under 35 U.S.C. 154(b) by 0 days.

(21) Appl. No.: 09/744,040

(22) PCT Filed: Jul. 14, 1999

(86) PCT No.: PCT/IB99/01323

§ 371 (c)(1),
(2), (4) Date: Mar. 26, 2001

(87) PCT Pub. No.: WO00/04718

PCT Pub. Date: Jan. 27, 2000

(30) Foreign Application Priority Data

Jul. 15, 1998 (EP) .............................................. 98401778
Jul. 22, 1998 (EP) .............................................. 98401870

(51) Int. Cl.$^7$ .............................................. G06F 1/24
(52) U.S. Cl. ....................... 713/156; 713/168; 713/171; 713/175; 713/200; 713/201; 380/232; 380/239
(58) Field of Search ................................ 713/156, 168, 713/171, 175, 200, 201; 380/232, 239

(56) References Cited

U.S. PATENT DOCUMENTS

| | | | | |
|---|---|---|---|---|
| 4,633,309 A | * | 12/1986 | Li et al. | 380/242 |
| 5,461,675 A | * | 10/1995 | Diehl et al. | 380/229 |
| 5,509,073 A | * | 4/1996 | Monnin | 380/229 |
| 5,563,948 A | * | 10/1996 | Diehl et al. | 380/229 |
| 5,748,732 A | | 5/1998 | Le Berre et al. | 380/10 |

FOREIGN PATENT DOCUMENTS

| | | |
|---|---|---|
| FR | 2 732 537 | 10/1996 |
| WO | WO 97/35430 | 9/1997 |
| WO | WO 97/38530 | 10/1997 |

OTHER PUBLICATIONS

Paper: 2244 Research Disclosure No. 335, Emsworth, GB, entitled "Encryption of Information to be recorded so as to prevent unauthorized playback", anonymous, dated Mar., 1992, 1 page.

W. Ford & B. O'Higgins; "Public–Key Cryptography and Open Systems Interconnection" IEEE Communications Magazine, vol. 30, No. 7; Jul., 1992, 6 pages.

Gerald J. Popek and Charles S. Kline, "Encryption and Secure Computer Networks", Computing Surveys, vol. 11, No. 4, Dec., 1979, 26 pages.

Patent Abstracts of Japan, English translation of abstract, "System for Transmitting Key of Encryptor", Publication No. 59067747, Date of Publication Apr. 17, 1984, one page.

* cited by examiner

Primary Examiner—Thomas R. Peeso
(74) Attorney, Agent, or Firm—Osha & May L.L.P.

(57) ABSTRACT

The present invention relates to a method of providing secure communication of information between at least a first and second digital audiovisual device (30, 52) and characterized in that the first device (30) communicates to the second device (52) a certificate Ct(KpubT) comprising a transport public key KpubT encrypted by a management private key KpriMan, the second device (52) decrypting the certificate using an equivalent management public key KpubMan and thereafter using the transport public key KpubT to encrypt information sent to the first device, the first device using an equivalent private key KpriT to decrypt the information. The present invention is particularly applicable to a method of providing secure communication between a first and second decoder.

51 Claims, 8 Drawing Sheets

METHOD AND APPARATUS FOR SECURE COMMUNICATION OF INFORMATION BETWEEN A PLURALITY OF DIGITAL AUDIOVISUAL DEVICES

This application is a 371 of PCT/IB99/01323 filed on Jul. 14, 1999.

The present invention relates to a method and apparatus for secure communication of information between a plurality of digital audiovisual devices connected in a network.

The present invention is particularly applicable to the field of digital television, where scrambled audiovisual information is broadcast to a number of subscribers, each subscriber possessing a decoder or integrated receiver/decoder (IRD) capable of descrambling the transmitted program for subsequent viewing.

In a typical system, scrambled digital audiovisual data is transmitted together with a control word for descrambling of the digital data, the control word itself being encrypted by an exploitation key and transmitted in encrypted form. A decoder receives the scrambled digital data and encrypted control word which uses an equivalent of the exploitation key to decrypt the encrypted control word and thereafter descramble the transmitted data. A paid-up subscriber will receive periodically the exploitation key necessary to decrypt the encrypted control word so as to permit viewing of a particular program. Encryption and decryption keys are conventionally stored in a portable security module, such as a smart card used to personalise the decoder.

A particular problem arises in the case of a user who has two or more decoders since existing subscription management systems often have difficulty in opening a second subscription for the same person at the same address. Consequently, in such circumstances, it would be advantageous to allow two or more decoders to function using the same subscription.

The PCT patent application WO 97/35430 in the name of News Datacom Limited shows one possible solution to this problem. In this system, a pair of decoders are organised in a master/slave configuration. Subscription rights are managed by the master decoder and its associated smart card. In order to transfer rights to the slave decoder, the slave smart card must be inserted at regular intervals in the master decoder. The disadvantage of this system is that a user is obliged to manually withdraw, recharge and replace the card in the slave decoder.

Other proposed solutions have included the generation of a duplicate smart card containing exactly the same rights as present in a master smart card. Such a solution is also undesirable, since it may not be wished to give exactly the same rights to multiple decoders and since the creation of a clone or duplicate card always incurs the risk fraud.

Another particular problem associated with data transmitted in a digital system lies in its ease of reproduction with no loss of quality. Where a descrambled program is passed via an analogue link (e.g. the "Peritel" link) for viewing and recording by a standard VCR the quality remains no greater than that associated with a standard analogue cassette recording.

By way of contrast, any descrambled digital data passed by a direct digital link to one of the new generation of digital recording devices (for example, a DVHS or DVD recorder) will be of the same quality as the originally transmitted program and may thus be reproduced any number of times without any degradation of image or sound quality. There is therefore a considerable risk that recorded descrambled data will be used as a master recording to make pirate copies.

French Patent Application 95 03859 shows one way of overcoming this problem. In this system, descrambled digital data is never recorded directly on the digital recording medium. Instead, the decoder described in this application forwards the data for recordal on the support medium in its scrambled form. The control word necessary to descramble the data is re-encrypted by means of another key and stored on the recording support with the scrambled data. This new key is known only to the receiver/decoder and replaces the exploitation key needed to obtain the control word for viewing of the program.

The advantage of such a system is that the data is never stored in a "clear" form and cannot be viewed without possession of the new key, stored in the decoder. The system also possesses the advantage that, since the exploitation key changes on a monthly basis, the use of a key chosen by the decoder to re-encrypt the control word registered on the digital tape means that the decoder will still be able to decrypt the control word recorded on the tape even after the end of a subscription month.

The disadvantage of the system proposed in this previous patent application is that the recording can only be viewed in conjunction with that particular decoder. If that decoder breaks down, or is replaced, the recording can no longer be replayed. Equally, it is not possible to play the recording directly in a digital recorder without connecting the decoder in the system.

In order to enable the decoder and recorder to function more effectively it is desired to provide a securised or encrypted communication link between the devices. As will be appreciated from the above description, the interaction of the decoder and recorder may lead to problems, for example, where scrambled transmissions are recorded but where only the decoder possesses the information needed to decrypt such transmissions. The implementation of a secure link between the devices can be used to enable information needed to prepare or play a recording to be passed freely between the devices.

It is an object of the present invention in its general and specific embodiments to overcome some or all of the problems of these prior art systems.

According to the present invention there is providing a method of providing secure communication of information between at least a first and second digital audiovisual device and characterised in that the second device receives a certificate comprising a transport public key encrypted by a management private key, the second device decrypting the certificate using an equivalent management public key and thereafter using the transport public key to encrypt information sent to the first device, the first device using an equivalent private key to decrypt the information.

In such a method, the first device can assume the role of a master device, personalised with a certificate generated using a management private key. The management private key is held in secret by the system manager and may not be derived from the information stored in the certificate. The second device can assume the role of a slave device. Information encrypted by the transport public key held by the second device may only be decrypted by the equivalent private key held by the first device. As will be described below, this information may thereafter be used to set up a secure bi-directional link to transfer subscription rights and other information.

Advantageously, the transport private/public key pair are uniquely associated with the first and second device pair. This ensures complete security of encrypted messages transmitted to the first device.

As will be appreciated, whilst the use of unique keys enables an increased level of security it may be decided in some cases to use non-unique keys, for example, for different pairs of devices distributed in different territories, where the security risk associated with such duplication is relatively low.

Preferably, the encrypted information sent by the second device comprises a session key, in particular, a session key generated by the second device and usable in conjunction with a symmetric encryption algorithm. This key, which may be generated at the initiation of a communication session for transfer of subscription can thereafter be used for bi-directional communication of information between the first and second devices.

In an alternative embodiment a session key pair corresponding to a private/public key pair of an asymmetric algorithm may be used.

The advantage of a changeable symmetric session key lies in the increased level of security that such a key provides as well as the possibility of bi-directional communication that it enables. Other embodiments are nevertheless possible, for example, in which transmission related information is directly encrypted using the transport public key held by the second device.

In one embodiment, the session key is used by the first device to encrypt control word information subsequently communicated to the second device. In such an embodiment, the second device decrypts the control word information using the equivalent session key and thereafter descrambles an associated transmission or programme for display.

In one embodiment, prior to the communication of the first certificate, the second device receives a secondary system certificate comprising the management public key encrypted by a system private key, the second device decrypting the system certificate using a system public key so as to obtain the management public key used thereafter to decrypt the encrypted transport public key.

This embodiment may be implemented, for example, where a different source for the first and second devices exists. The system private key may be held in secret by, for example, the source of the second device. A system certificate will only be issued in the event that the second device source is sure of the integrity of security at the first device source. Thereafter, a designated first device source will embed this certificate in all first device smart cards, such that a second device smart card can authenticate the origin of such cards.

As will be understood, the second device source need only know the management public key of the first device source in order to generate a system certificate and neither party needs to share its private encryption keys in carrying out these certifying operations.

The secure communication link between the devices may be used to convey many different types of information, including different information relating to descrambling a transmission or even other matters. In particular, whilst the above embodiments discuss the use of a session key in the encryption and communication of control word information, other embodiments are possible. For example, audio and/or visual data to be recorded may be directly encrypted by the first device using a session key and communicated directly to the second device for decryption and display.

Other embodiments may use the secure communication link to transfer, for example, exploitation keys present in the first device such that the second device can carry out all operations to decrypt control word information and descramble a transmission in the same manner as the first device.

Whilst the above description has described encryption and decryption operations in relation to a first and second device it is to be understood that these operations and, in particular the keys needed in such operations, need not necessarily be managed or held by elements permanently integrated in the devices themselves.

In particular, in a preferred embodiment, the first and second devices further comprise first and second portable security modules used to carry out some or all of the encryption or decryption steps described above.

Such portable security devices can take any convenient form depending on the physical size and characteristics of the device. For example, whilst in some cases a smart card equivalent to a bank card may be used, other formats such as PCMCIA type cards are equally possible.

The physical communication link between the two devices may take many forms, for example, a radio, telephone or infra-red link. However, preferably, the communication link is implemented by connection of the first and second decoders on a bus, for example, a IEEE 1394 bus link.

Whilst the invention has been described with reference to a first and second device, it will be appreciated that the same principal may be used to set up a chain of communication between a series of such devices, e.g. between a single master device and a plurality of slave devices.

The present invention is particularly, but not exclusively, applicable to the implementation of secure communication link between a first and second decoder. However, other applications of the invention for use with other digital audiovisual devices may be envisaged, for example, to encrypt information from a decoder to a digital VCR, between two digital VCRs etc.

In one preferred embodiment, the devices comprise a decoder device and a recorder device. Thus, the present invention extends to a method of providing secure communication of information between a decoder device and a recorder device and characterised in that a first one of the devices communicates to the second device a certificate comprising a device public key encrypted by a management private key, the second device decrypting the certificate using an equivalent management public key and thereafter using the device public key to encrypt information sent to the first device, the first device using an equivalent device private key to decrypt the information.

In such a method, the first device initiating the communication is personalised with a certificate generated by a management private key. The management private key is held in secret by the source responsible for this device (e.g. a recorder device manufacturer) and may not be derived from the information stored in the certificate. The communication of such a certificate therefore provides the second device with a level of assurance concerning the identity and origin of the device initiating the communication.

In addition, the information encrypted by the device public key held by the second device may only be decrypted by the equivalent private key held by the first device thereby enabling the second device to communicate in confidence information to the first device. As will be described below, this information may thereafter be used to set up a secure bi-directional link.

Preferably, prior to the communication of the first device certificate, the first device communicates to the second device a system certificate comprising the management public key encrypted by a system private key, the second device decrypting the system certificate using a system public key so as to obtain the management public key used thereafter to decrypt the device certificate.

The private system key may be held in secret by, for example, the source of the second device (e.g. a broadcast system manager responsible for the decoder). A system certificate will only be issued in the event that the second device source is sure of the integrity of security at the first device source, that is, that the second device source is sure that the management private key is only known to by the first device source and that the necessary measures have been put in place to keep this key secret.

As will be understood, the second device source need only know the public management key of the first device source in order to generate a system certificate and neither party needs to share its private encryption keys in carrying out these certifying operations.

Advantageously, the device private/public key pair are uniquely associated with the first device. This ensures complete security of encrypted messages transmitted to the first device. Further advantageously, the management private/public key pair are uniquely associated with the source of the first device and the system private/public key pair (if present) are uniquely associated with the source of the second device.

As will be appreciated, although the use of unique keys enables an increased level of security, it may be decided in some cases to use non-unique keys. For example, in the case of high volume of production of first devices, certain of these devices may share the same device private key if such devices are distributed in different territories, since the security risk associated with such duplication is relatively low.

Preferably, the encrypted information sent by the second device comprises a session key, in particular, a session key generated by the second device and usable in conjunction with a symmetric encryption algorithm. This key, which may be generated at the initiation of a recording session can thereafter be used for bi-directional communication of information between the first and second devices.

In an alternative embodiment, a session key pair corresponding to a private/public key pair of an asymmetric algorithm may be used.

The advantage of a changeable session key lies in the increased level of security that such a key provides as well as the possibility of secure bi-directional communication that it enables if a symmetric session key is chosen. Other embodiments are nevertheless possible, for example, in which information associated with a recording operation may be directly encrypted using the device public key held by the second device.

In one embodiment, the session key is used by the decoder device to encrypt control word information subsequently communicated to the recorder device. In such an embodiment, the recorder device may decrypt the control word information using the equivalent session key and thereafter re-encrypt the control word information using a recording encryption key, the re-encrypted control word information being stored by the recorder on a recording support medium together with the scrambled transmission data associated with that control word information.

The encryption of control word information using a recording key held by the recorder device enables the recorder device to replay at any time a recorded scrambled transmission independently of the decoder device originally used to receive and forward the transmission.

Advantageously, the recorder device communicates to the decoder device a copy of the recording encryption key. This may be conveniently encrypted by the session key prior to communication. This copy may thereafter be decrypted by the decoder and a back-up copy of the recording key stored in the decoder.

As will be understood, the secure communication link may be used to convey many different types of information. In particular, whilst the above embodiments discuss the use of a session key in the encryption and communication of control word information for use in a recording operation, other embodiments are possible. For example, audio and/or visual data to be recorded may be directly encrypted by the decoder using a session key and communicated to the recorder for decryption and subsequent re-encryption prior to recordal.

Other embodiments may use the secure communication link to transfer, for example, decoder exploitation keys to the recorder device such that the recorder device can carry out all operations to decrypt control word information and/or descramble a transmission prior to its recordal in a re-encrypted or rescrambled form on a recording support medium.

Whilst the above description has described encryption and decryption operations in relation to a decoder device or recorder device it is to be understood that these operations and, in particular the keys needed in such operations, need not necessarily handled by elements permanently integrated in the devices themselves.

In particular, in a preferred embodiment, the recorder and/or decoder device may further comprise a portable security module associated with that device and used to carry out some or all of the encryption or decryption steps described above.

Such portable security devices can take any convenient form depending on the physical size and characteristics of the decoder or recorder. For example, a smart card or PCMCIA type card may be used with a decoder and a SIM card or similar with a recorder.

In a particularly preferred embodiment of the invention, the first device corresponds to a recorder device and the second device to a decoder device. In such a system the decoder system manager will have ultimate control, for example, over generation of system certificates issued to recorder manufacturers. Similarly communication will be initiated by the recorder, the decoder only communicating an encrypted message containing the information that will be needed to set up a bi-directional communication in the event that the recorder has communicated correct system and/or management certificates.

Whilst the invention is particularly convenient where the decoder and recorder are physically separate, the invention may equally be used in a combination recorder/decoder apparatus to provide, for example, a secure bus link between the recorder and decoder devices within the combined apparatus.

The present invention is particularly but not exclusively adapted for use with a digital television transmission system in which the decoders are adapted to receive a digital television transmission.

The present invention has been described above in relation to a method of communication. The invention equally extends to a first and second device adapted for use in such a method and one or more portable security modules adapted for use in such a system.

Suitable algorithms for use in this invention for generating private/public keys may include, for example, RSA or Diffie-Hellman, and suitable symmetric key algorithms may include DES type algorithms, for example. However, unless obligatory in view of the context or unless otherwise specified, no general distinction is made between keys associated with symmetric algorithms and those associated with public/private algorithms.

The terms "scrambled" and "encrypted" and "control word" and "key" have been used at various parts in the text for the purpose of clarity of language. However, it will be understood that no fundamental distinction is to be made between "scrambled data" and "encrypted data" or between a "control word" and a "key". Similarly, the term "equivalent key" is used to refer to a key adapted to decrypt data encrypted by a first mentioned key, or vice versa.

The term "receiver/decoder" or "decoder" as used herein may connote a receiver for receiving either encoded or non-encoded signals, for example, television and/or radio signals, which may be broadcast or transmitted by some other means. The term may also connote a decoder for decoding received signals. Embodiments of such decoders may also include a decoder integral with the receiver for decoding the received signals, for example, in a "set-top box", a decoder functioning in combination with a physically separate receiver, or such a decoder including additional functions, such as a web browser or a video recorder or a television.

As used herein, the term "digital transmission system" includes any transmission system for transmitting or broadcasting for example primarily audiovisual or multimedia digital data. Whilst the present invention is particularly applicable to a broadcast digital television system, the invention may also be applicable to a fixed telecommunications network for multimedia internet applications, to a closed circuit television, and so on.

As used herein, the term "digital television system" includes for example any satellite, terrestrial, cable and other system.

There will now be described, by way of example only, a number of embodiments of the invention, with reference to the following figures, in which.

Figure 1:
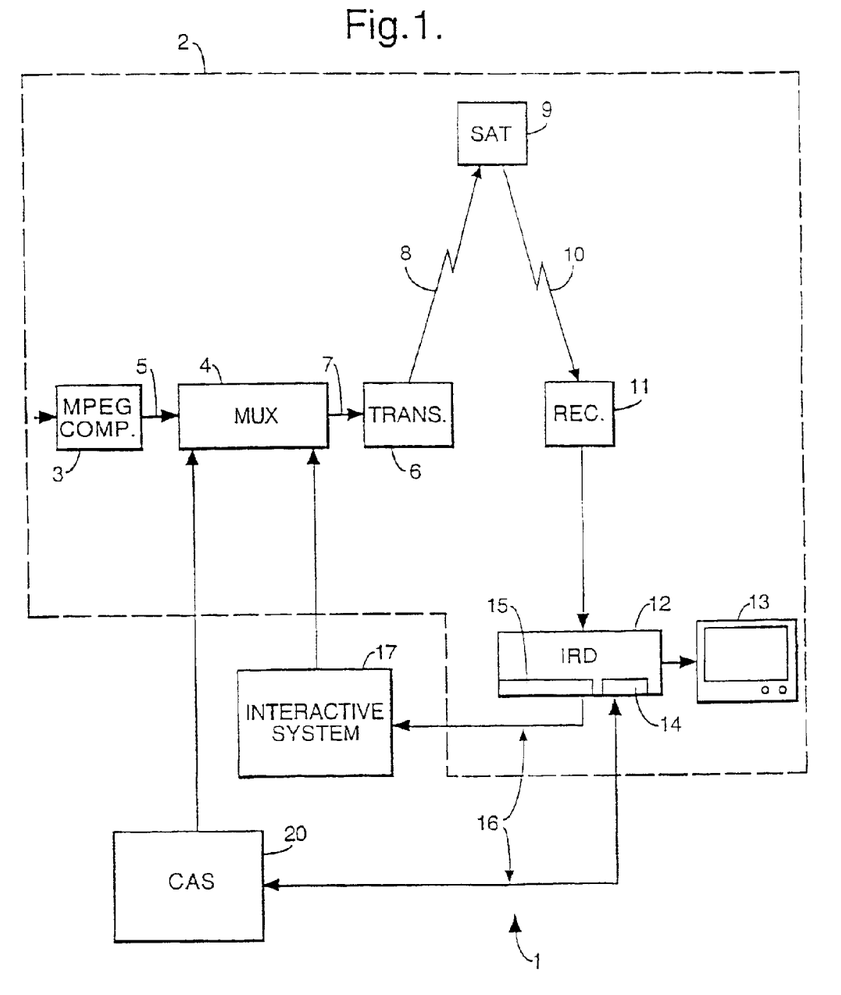
FIG. 1 shows the overall architecture of a digital TV system according to this embodiment.

An overview of a digital television broadcast and reception system 1 is shown in FIG. 1. The invention includes a mostly conventional digital television system 2 which uses the MPEG-2 compression system to transmit compressed digital signals. In more detail, MPEG-2 compressor 3 in a broadcast centre receives a digital signal stream (for example a stream of audio or video signals). The compressor 3 is connected to a multiplexer and scrambler 4 by linkage 5. The multiplexer 4 receives a plurality of further input signals, assembles one or more transport streams and transmits compressed digital signals to a transmitter 6 of the broadcast centre via linkage 7, which can of course take a wide variety of forms including telecom links.

The transmitter 6 transmits electromagnetic signals via uplink 8 towards a satellite transponder 9, where they are electronically processed and broadcast via a notional downlink 10 to earth receiver 11, conventionally in the form of a dish owned or rented by the end user. The signals received by receiver 11 are transmitted to an integrated receiver/decoder 12 owned or rented by the end user and connected to the end user's television set 13. The receiver/decoder 12 decodes the compressed MPEG-2 signal into a television signal for the television set 13.

A conditional access system 20 is connected to the multiplexer 4 and the receiver/decoder 12, and is located partly in the broadcast centre and partly in the decoder. It enables the end user to access digital television broadcasts from one or more broadcast suppliers. A smartcard, capable of decrypting messages relating to commercial offers (that is, one or several television programmes sold by the broadcast supplier), can be inserted into the receiver/decoder 12. Using the decoder 12 and smartcard, the end user may purchase events in either a subscription mode or a payperview mode.

An interactive system 17, also connected to the multiplexer 4 and the receiver/decoder 12 and again located partly in the broadcast centre and partly in the decoder, may be provided to enable the end user to interact with various applications via a modemmed back channel 16.

Figure 2:
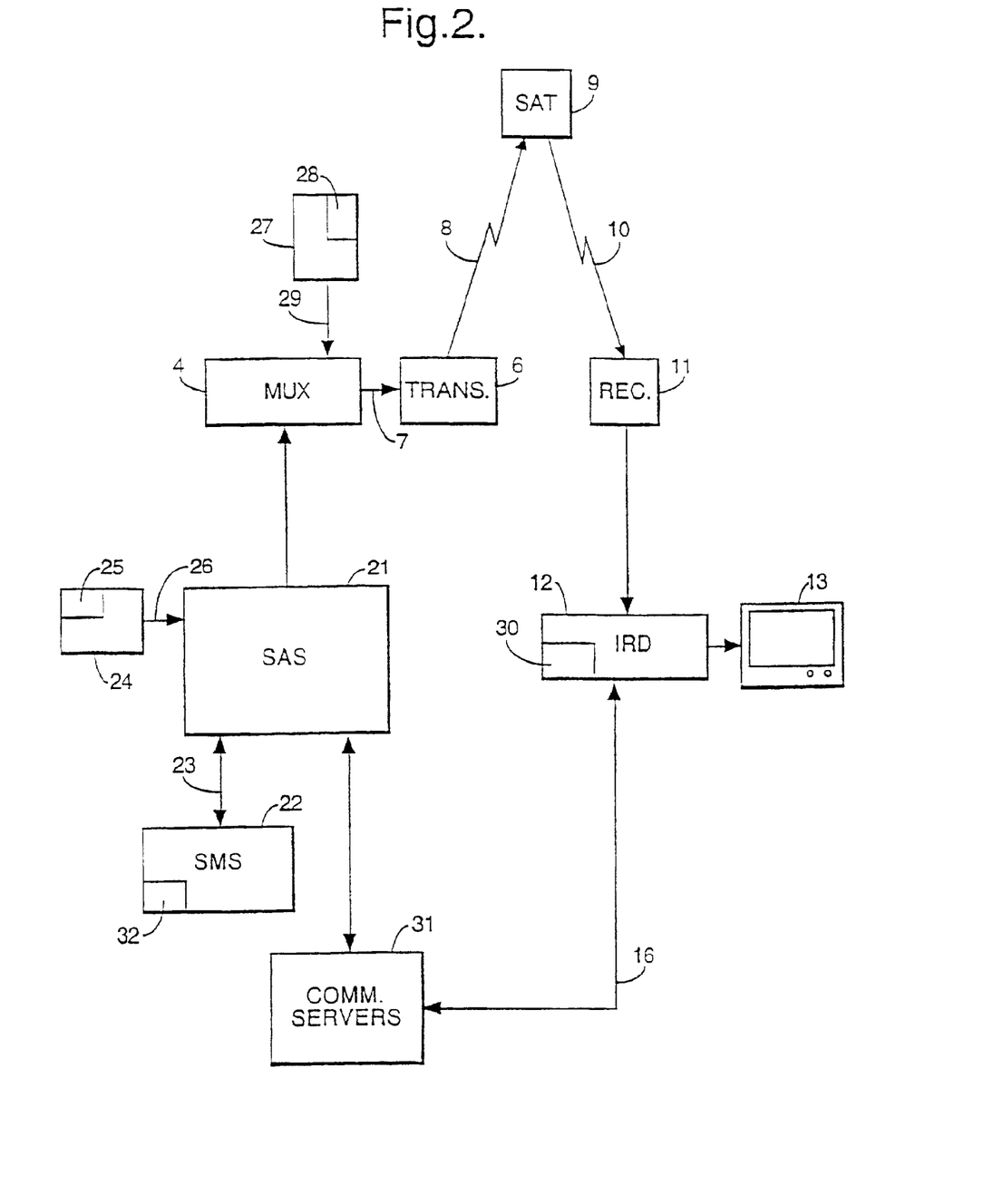
FIG. 2 shows the architecture of the conditional access system of FIG. 1.

The conditional access system 20 will now be described in more detail. With reference to FIG. 2, in overview the conditional access system 20 includes a Subscriber Authorization System (SAS) 21. The SAS 21 is connected to one or more Subscriber Management Systems (SMS) 22, one SMS for each broadcast supplier, for example by a respective TCP-IP linkage 23 (although other types of linkage could alternatively be used). Alternatively, one SMS could be shared between two broadcast suppliers, or one supplier could use two SMSs, and so on.

First encrypting units in the form of ciphering units 24 utilising "mother" smartcards are connected to the SAS by linkage 26. Second encrypting units again in the form of ciphering units 27 utilising mother smartcards 28 are connected to the multiplexer 4 by linkage 29. The receiver/decoder 12 receives a portable security module, for example in the form of "daughter" smartcard 30. It is connected directly to the SAS 21 by Communications Servers 31 via the modemmed back channel 16. The SAS sends, amongst other things, subscription rights to the daughter smartcard on request.

The smartcards contain the secrets of one or more commercial operators. The "mother" smartcard encrypts different kinds of messages and the "daughter" smartcards decrypt the messages, if they have the rights to do so.

The first and second ciphering units 24 and 27 comprise a rack, an electronic VME card with software stored on an EEPROM, up to 20 electronic cards and one smartcard 25 and 28 respectively, for each electronic card, one card 28 for encrypting the ECMs and one card 25 for encrypting the EMMs.

The operation of the conditional access system 20 of the digital television system will now be described in more detail with reference to the various components of the television system 2 and the conditional access system 20.

Multiplexer and Scrambler

With reference to FIGS. 1 and 2, in the broadcast centre, the digital audio or video signal is first compressed (or bit rate reduced), using the MPEG-2 compressor 3. This compressed signal is then transmitted to the multiplexer and scrambler 4 via the linkage 5 in order to be multiplexed with other data, such as other compressed data.

The scrambler generates a control word used in the scrambling process and included in the MPEG-2 stream in the multiplexer. The control word is generated internally and enables the end user's integrated receiver/decoder 12 to descramble the programme.

Access criteria, indicating how the programme is commercialised, are also added to the MPEG-2 stream. The programme may be commercialised in either one of a number of "subscription" modes and/or one of a number of "Pay Per View" (PPV) modes or events. In the subscription mode, the end user subscribes to one or more commercial offers, or "bouquets", thus getting the rights to watch every channel inside those bouquets. In the preferred embodiment, up to 960 commercial offers may be selected from a bouquet of channels.

In the Pay Per View mode, the end user is provided with the capability to purchase events as he wishes. This can be achieved by either pre-booking the event in advance ("pre-book mode"), or by purchasing the event as soon as it is broadcast ("impulse mode"). In the preferred embodiment, all users are subscribers, whether or not they watch in subscription or PPV mode, but of course PPV viewers need not necessarily be subscribers.

Entitlement Control Messages

Both the control word and the access criteria are used to build an Entitlement Control Message (ECM). This is a message sent in relation with a scrambled program; the message contains a control word (which allows for the descrambling of the program) and the access criteria of the broadcast program. The access criteria and control word are transmitted to the second encrypting unit 27 via the linkage 29. In this unit, an ECM is generated, encrypted and transmitted on to the multiplexer and scrambler 4. During a broadcast transmission, the control word typically changes every few seconds, and so ECMs are also periodically transmitted to enable the changing control word to be descrambled. For redundancy purposes, each ECM typically includes two control words; the present control word and the next control word.

Each service broadcast by a broadcast supplier in a data stream comprises a number of distinct components; for example a television programme includes a video component, an audio component, a sub-title component and so on. Each of these components of a service is individually scrambled and encrypted for subsequent broadcast to the transponder 9, In respect of each scrambled component of the service, a separate ECM is required. Alternatively, a single ECM may be required for all of the scrambled components of a service. Multiple ECMs are also generated in the case where multiple conditional access systems control access to the same transmitted program.

Entitlement Management Messages (EMMs)

The EMM is a message dedicated to an individual end user (subscriber), or a group of end users. Each group may contain a given number of end users. This organisation as a group aims at optimising the bandwidth; that is, access to one group can permit the reaching of a great number of end users.

Various specific types of EMM can be used. Individual EMMs are dedicated to individual subscribers, and are typically used in the provision of Pay Per View services; these contain the group identifier and the position of the subscriber in that group.

Group subscription EMMs are dedicated to groups of, say, 256 individual users, and are typically used in the administration of some subscription services. This EMM has a group identifier and a subscribers' group bitmap.

Audience EMMs are dedicated to entire audiences, and might for example be used by a particular operator to provide certain free services. An "audience" is the totality of subscribers having smartcards which bear the same conditional access system identifier (CA ID). Finally, a "unique" EMM is addressed to the unique identifier of the smartcard.

EMMs may be generated by the various operators to control access to rights associated with the programs transmitted by the operators as outlined above. EMMs may also be generated by the conditional access system manager to configure aspects of the conditional access system in general.

Programme Transmission

The multiplexer 4 receives electrical signals comprising encrypted EMMs from the SAS 21, encrypted ECMs from the second encrypting unit 27 and compressed programmes from the compressor 3. The multiplexer 4 scrambles the programmes and sends the scrambled programmes, the encrypted EMMs and the encrypted ECMs to a transmitter 6 of the broadcast centre via the linkage 7. The transmitter 6 transmits electromagnetic signals towards the satellite transponder 9 via uplink 8.

Programme Reception

The satellite transponder 9 receives and processes the electromagnetic signals transmitted by the transmitter 6 and transmits the signals on to the earth receiver 11, conventionally in the form of a dish owned or rented by the end user, via downlink 10. The signals received by receiver 11 are transmitted to the integrated receiver/decoder 12 owned or rented by the end user and connected to the end user's television set 13. The receiver/decoder 12 demultiplexes the signals to obtain scrambled programmes with encrypted EMMs and encrypted ECMs.

If the programme is not scrambled, that is, no ECM has been transmitted with the MPEG-2 stream, the receiver/decoder 12 decompresses the data and transforms the signal into a video signal for transmission to television set 13.

If the programme is scrambled, the receiver/decoder 12 extracts the corresponding ECM from the MPEG-2 stream and passes the ECM to the "daughter" smartcard 30 of the end user. This slots into a housing in the receiver/decoder 12. The daughter smartcard 30 controls whether the end user has the right to decrypt the ECM and to access the programme. If not, a negative status is passed to the receiver/decoder 12 to indicate that the programme cannot be descrambled. If the end user does have the rights, the ECM is decrypted and the control word extracted. The decoder 12 can then descramble the programme using this control word. The MPEG-2 stream is decompressed and translated into a video signal for onward transmission to television set 13.

Subscriber Management System (SMS)

A Subscriber Management System (SMS) 22 includes a database 32 which manages, amongst others, all of the end user files, commercial offers, subscriptions, PPV details, and data regarding end user consumption and authorization. The SMS may be physically remote from the SAS.

Each SMS 22 transmits messages to the SAS 21 via respective linkage 23 which imply modifications to or creations of Entitlement Management Messages (EMMs) be transmitted to end users.

The SMS 22 also transmits messages to the SAS 21 which imply no modifications or creations of EMMs but imply only a change in an end user's state (relating to the authorization granted to the end user when ordering products or to the amount that the end user will be charged).

The SAS 21 sends messages (typically requesting information such as call-back information or billing information)

to the SMS 22, so that it will be apparent that communication between the two is two-way.

Subscriber Authorization System (SAS)

The messages generated by the SMS 22 are passed via linkage 23 to the Subscriber Authorization System (SAS) 21, which in turn generates messages acknowledging receipt of the messages generated by the SMS 21 and passes these acknowledgements to the SMS 22.

In overview the SAS comprises a Subscription Chain area to give rights for subscription mode and to renew the rights automatically each month, a Pay Per View Chain area to give rights for PPV events, and an EMM Injector for passing EMMs created by the Subscription and PPV chain areas to the multiplexer and scrambler 4, and hence to feed the MPEG stream with EMMs. If other rights are to be granted, such as Pay Per File (PPF) rights in the case of downloading computer software to a user's Personal Computer, other similar areas are also provided.

One function of the SAS 21 is to manage the access rights to television programmes, available as commercial offers in subscription mode or sold as PPV events according to different modes of commercialisation (pre-book mode, impulse mode). The SAS 21, according to those rights and to information received from the SMS 22, generates EMMs for the subscriber.

The EMMs are passed to the Ciphering Unit (CU) 24 for ciphering with respect to the management and exploitation keys. The CU completes the signature on the EMM and passes the EMM back to a Message Generator (MG) in the SAS 21, where a header is added. The EMMs are passed to a Message Emitter (ME) as complete EMMs. The Message Generator determines the broadcast start and stop time and the rate of emission of the EMMs, and passes these as appropriate directions along with the EMMs to the Message Emitter. The MG only generates a given EMM once; it is the ME which performs cyclic transmission of the EMMs.

On generation of an EMM, the MG assigns a unique identifier to the EMM. When the MG passes the EMM to the ME, it also passes the EMM ID. This enables identification of a particular EMM at both the MG and the ME.

In systems such as simulcrypt which are adapted to handle multiple conditional access systems e.g. associated with multiple operators, EMM streams associated with each conditional access system are generated separately and multiplexed together by the multiplexer 4 prior to transmission.

Encryption Levels of the Broadcast System

Figure 3:
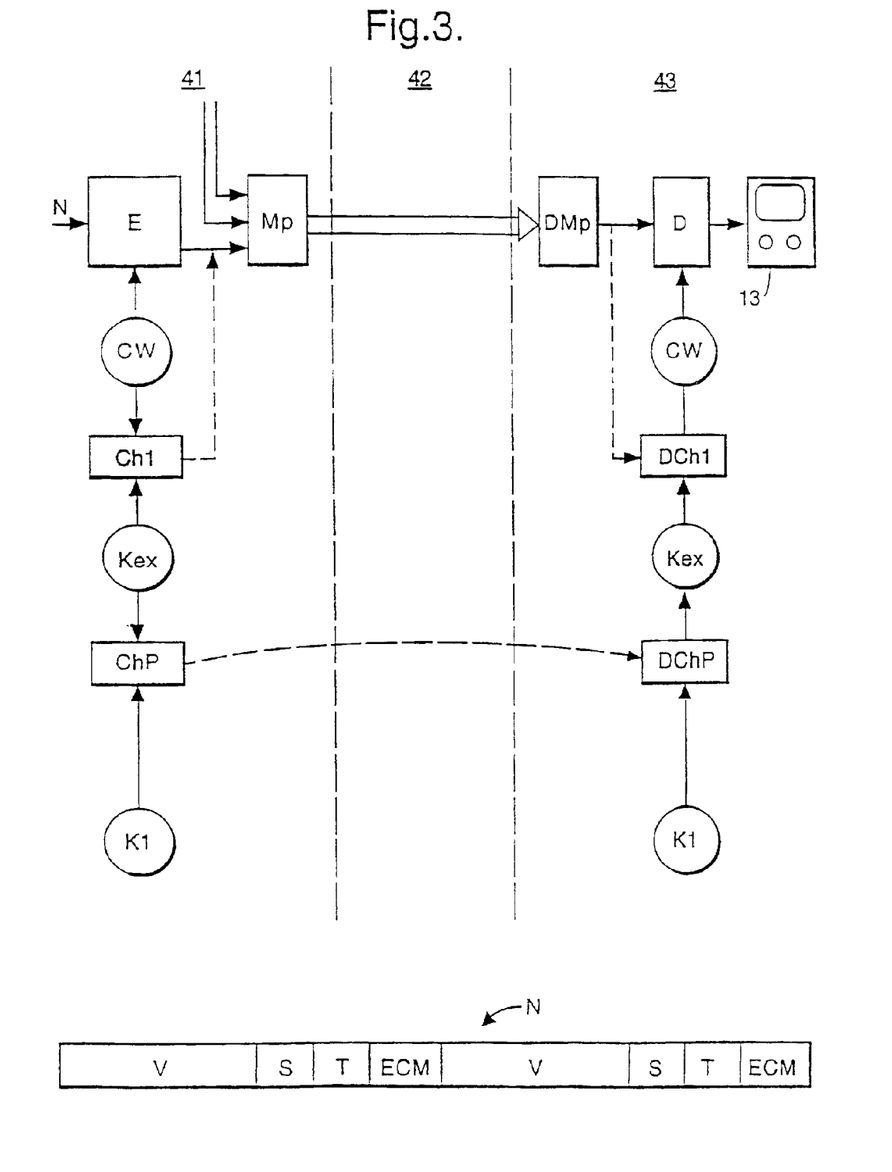
FIG. 3 shows the encryption levels in the conditional access system.

Referring now to FIG. 3, a simplified outline of the encryption levels in a standard broadcast system will now be described. The stages of encryption associated with the broadcast of the digital data are shown at 41, the transmission channel (eg a satellite link as described above) at 42 and the stages of decryption at the receiver at 43.

The digital data N is scrambled by a control word CW before being transmitted to a multiplexer Mp for subsequent transmission. As will be seen from the lower part of FIG. 3, the transmitted data includes an ECM comprising, inter alia, the control word CW as encrypted by an encrypter Ch1 controlled by an exploitation key Kex. At the receiver/decoder, the signal passes by a demultiplexer DMp and descrambler D before being passed to a television 13 for viewing. A decryption unit DCh1 also possessing the key Kex decrypts the ECM in the demultiplexed signal to obtain the control word CW subsequently used to descramble the signal.

For security reasons, the control word CW embedded in the encrypted ECM changes on average every 10 seconds or so. In contrast, the first encryption key Kex used by the receiver to decode the ECM is changed every month or so by means of an operator EMM. The encryption key Kex is encrypted by a second unit ChP using a personalised group key K1(GN). If the subscriber is one of those chosen to receive an updated key Kex, a decryption unit DChP in the decoder security module will decrypt the message using its group key K1(GN) to obtain that month's key Kex.

The decryption units DChp and DCh1 and the associated keys are held on a security module associated with the decoder, in this case the smart card 30 provided to the subscriber and inserted in a smart card reader in the decoder. The keys may be generated, for example, according to any generally used symmetric key algorithm or in accordance with a customised symmetric key algorithm.

As will be described, different keys may be associated with different operators or broadcasters as well as with the conditional access system supplier. In the above description, a group key K1(GN) is held by the smart card associated with the decoder and used to decrypt EMM messages. In practice, different operators will have different subscriber unique keys K1 (Op1, GN), K1 (Op2, GN) etc. Each group key is generated by an operator and diversified by a value associated with the group to which the subscriber belongs.

Different memory zones in the smart card hold the keys for different operators. Each operator may also have a unique key associated solely with the smart card in question and an audience key for all subscribers to the services provided by that operator (see above).

In addition, a set of keys may also be held by the manager of the conditional access system. In particular, a given smart card may include a user specific key K0 (NS) and an audience key K1 (C), common to all smart cards. Whilst the operator keys are generally used to decode EMM messages associated with broadcast rights, the conditional access manager keys may be used to decrypt EMM messages associated with changes to conditional access system in general, as will be described below.

Figure 4:
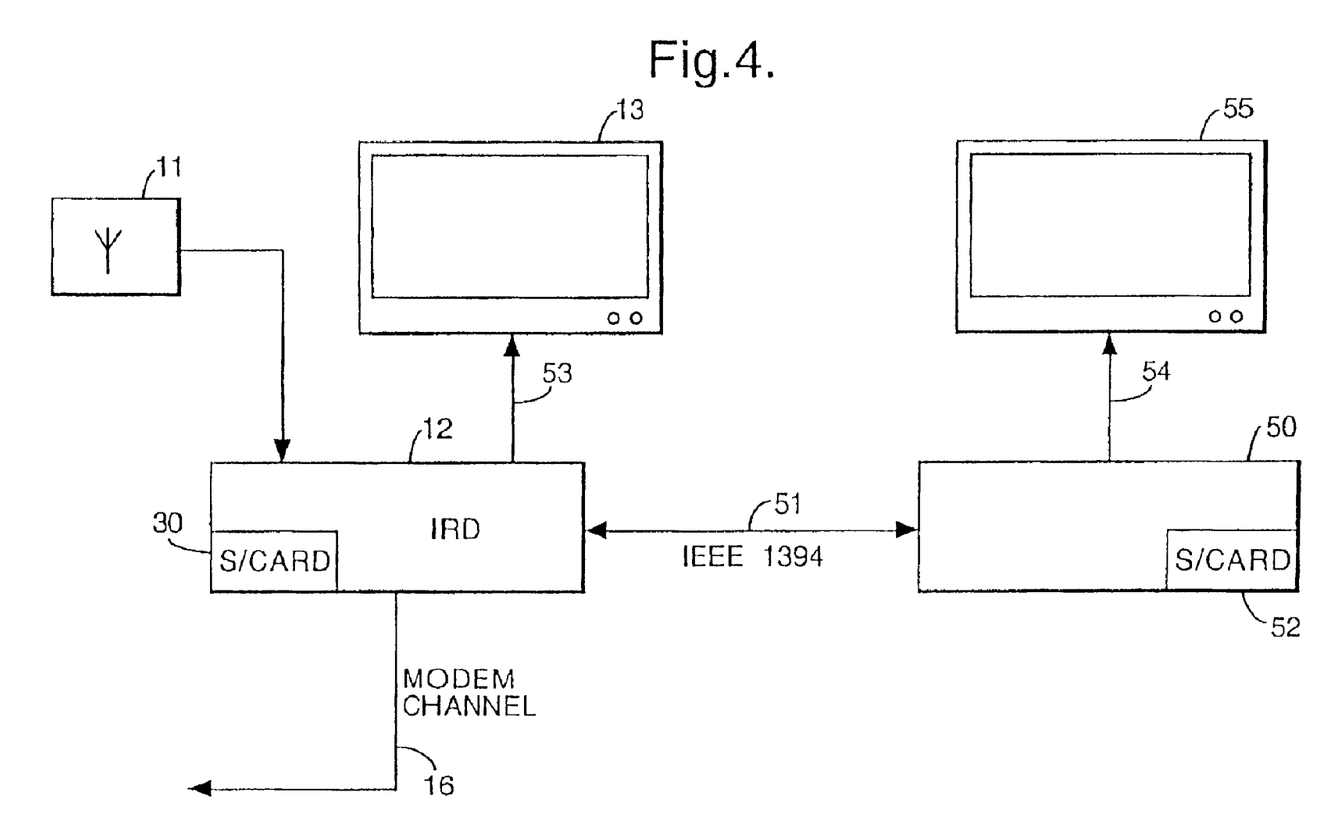
FIG. 4 shows the layout of a first and second decoder.

The above description of the system shown in FIG. 3 relates to the implementation of access control in a broadcast system in which transmissions are descrambled by a single decoder and displayed on a single television display. Referring to FIG. 4, a first and second decoder configuration will now be described.

Decoder Configuration

As before, a decoder 12 receives scrambled broadcast transmissions via a receiver 11. The decoder includes a portable security module 30, which may conveniently take the form of a smart card, but which may comprise any other suitable memory or microprocessor portable device. The decoder 12 is connected to a modem channel 16, for example, for communicating with servers handling conditional access information and is also adapted to pass descrambled audiovisual display information, e.g. via a Peritel link 53, to a television 13.

The system additionally includes a dependent or slave decoder 50 adapted to communicate with the decoder 12, for example, via an IEEE 1394 bus 51. The decoder 50 may include a connection (not shown) to the receiver 11 or to another satellite receiver to directly receive scrambled broadcast transmissions. Alternatively, this information may be passed from the first decoder 12 via the connection 51.

The second decoder 50 is further adapted to function with a portable security module 52. The portable security module 52 may conveniently be implemented as smart card. However, any portable memory and/or microprocessor device as is conventionally known, such as a PCMCIA card, a microprocessor key etc. may be used. The operation of this module 52 in descrambling transmissions will be explained below.

The decoder 50 also includes a link 54 to a television display 55 used to display descrambled transmissions. Whilst the elements of the decoders 12, 50 and the displays 13, 55 have been indicated separately, it is envisaged that some or all of these elements may be merged, for example, to provide a combined decoder/television set.

Secure Communication between Decoders

As set out in the introduction, in order to avoid problems relating to management of subscription data, it is desirable that only a single subscription is opened for the owner of the two decoders 12, 50. In the case where the decoder 12 is the principal or first decoder in the system, smart card 30 will be personalised to receive the monthly exploitation key Kex as described above in relation to FIG. 3. In order to enable the decoder 50 to descramble and display a transmission via the display 55 it will be necessary to communicate certain information from the security module 30 to the security module 52 to enable this descrambling to be carried out.

In the present embodiment, the smart card 30 decrypts the ECM messages associated with a transmission so as to obtain the control word CW value. This control word value is then communicated in an encrypted form via the link 51 to the decoder 50 and smart card 52, where it is used by the decoder 50 and smart card 52 to descramble the transmission and display the programme via the display 55.

Embodiments other than this control word embodiment may nevertheless be envisaged, for example, in which a copy of the monthly exploitation Kex is passed to the decoder and smart card 50, 52 to enable the decoder 50 to operate independently thereafter.

As will be appreciated, in order to avoid any problems of fraud, it is essential that control word information or, indeed, any other information used in decrypting and descrambling a transmission, is never transmitted in a clear form over the link 51.

There will now be described with reference to FIGS. 5 and 6, a method for enabling such a secure communication link to be implemented.

For the sake of clarity, all encryption operations using a public/private key algorithm are indicated by means of the symbol $f_a$, whilst all operations using a symmetric algorithm are indicated by the symbol $f_s$. Decryption operations are indicated as $f_a"$ or $f_s"$.

Private/public keys pairs may be generated in accordance with any suitable asymmetric encryption algorithm such as RSA or Diffie-Hellman. Symmetric keys may be used with algorithms such as DES. In some cases, custom symmetric algorithms may also be used.

Figure 5:
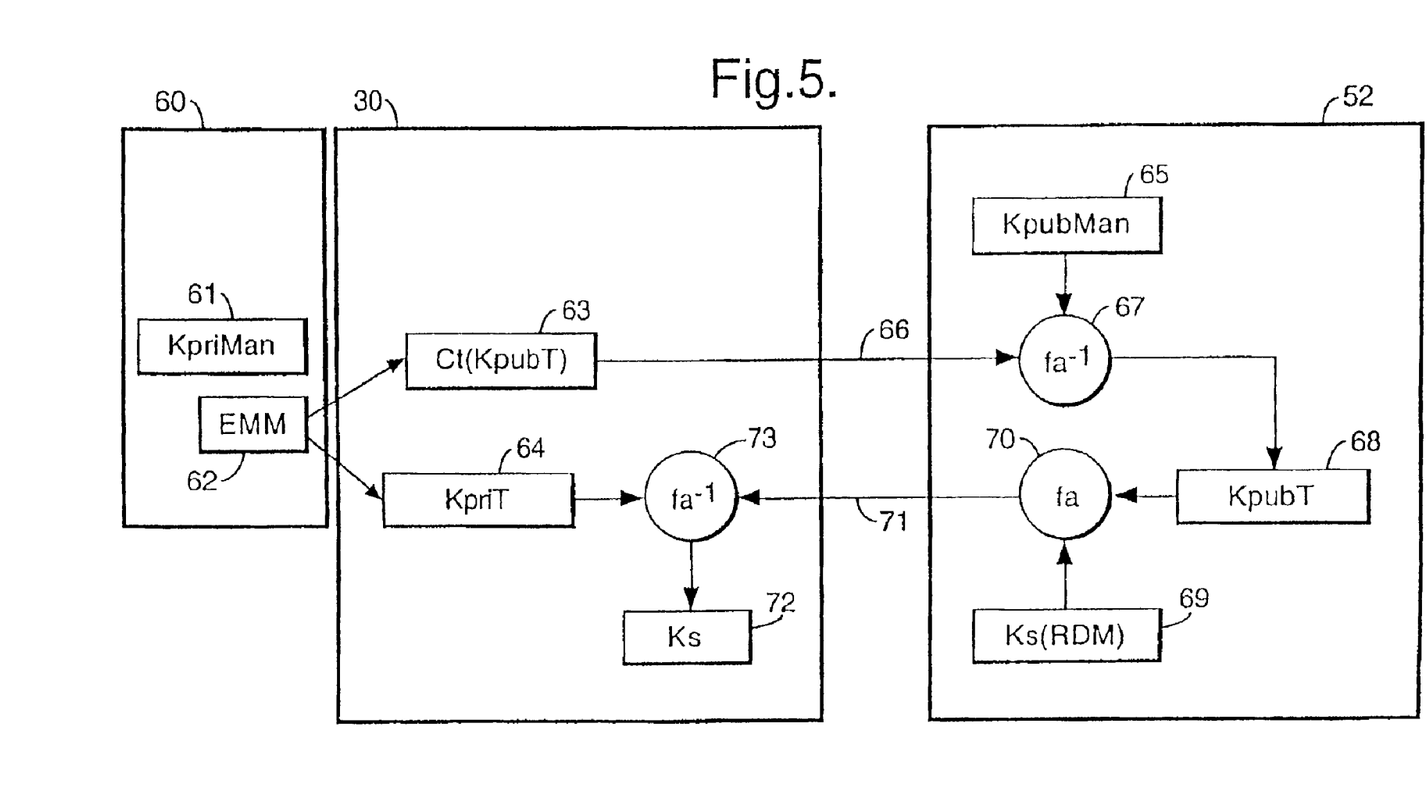
FIG. 5 shows the steps associated with setting up a secure communication link between the first and second decoder.

Referring to FIG. 5, the smart card 52 for the decoder 50 is personalised with a public key KpubMan shown at 65 and equivalent to the public key associated with a private management key KpriMan shown at 61. In practice, all smartcards 52 intended for use with dependent or slave decoders will include the key KpubMan.

This personalisation step will be normally carried out in private at the headquarters of the system manager, either at the moment of first personalisation of the card (if it is already envisaged to provide a second decoder) or when a user demands the inclusion of a second decoder in his subscription.

Subsequently, the system manager possessing the secret private key KpriMan shown at 61 will communicate in a dedicated EMM message 62 a certificate Ct(KpubT) shown at 63. The certificate is prepared by encrypting a public key KpubT with the private manager key KpriMan. The EMM further includes a private key KpriT shown at 64 and stored together with the certificate Ct(KpubT) in the non-volatile memory of the smart card 30.

This EMM is itself encrypted in the normal manner for EMMs dedicated to one decoder using appropriate transmission or exploitation keys, such that only the decoder 12 and card 30 may decrypt this EMM message.

At the moment when the two decoders are put in communication via the IEEE 1394 link 51, the smart card 30 sends the certificate Ct(KpubT) to the smart card 52 as shown at 66. Using the public key KpubMan, the card decrypts the certificate at 67 to obtain the public key KpubT as shown at 68. This public key KpubT will thereafter be uniquely associated with the pairs of decoders 12, 50 and cards 30, 52.

The card 52 thereafter generates a random key value Ks shown at 69. As will be described, this random key is later used as a session key in conjunction with a symmetric algorithm to encrypt messages communicated in both directions between the cards 30, 52. A new session key value may be generated at every subsequent reconnection of the decoder 50 and card 52 in the system, i.e. every time the decoder is switched on by a user, or at every viewing session, for example, of a pay per view film.

The symmetric key Ks is encrypted at 70 using the public key KpubT and the encrypted value sent at 71 to the smart card 30. The card 30 decrypts the message at 73 with the private key KpriT and stores the session key value at 72. As will be understood, in view of the nature of private/public encryption algorithms the encrypted message may only be decrypted by a card possessing the private key KpriT, that is, by the card 30.

As described above, the cards 30, 52 are programmed by the same system manager who embeds or communicates the values KpriT, Ct(KpubT) and KpubMan to the respective cards 30, 52. In a further realisation (not shown) a second layer of authorisation may be provided using a system private key KpriSystem. In this realisation, a certificate Ct(KpubMan) comprising the key KpubMan encrypted by KpriSystem is stored in the card 30.

In such a realisation, the card 52 further possesses a secondary system public key KpubSystem. In operation, the card 30 sends the encrypted value of certificate Ct(KpubMan) to the card 52 which decrypts this message using KpubSystem to obtain KpubMan. Thereafter, the steps are the same as above; with the card 52 using the key KpubMan to obtain KpubT etc.

Figure 6:
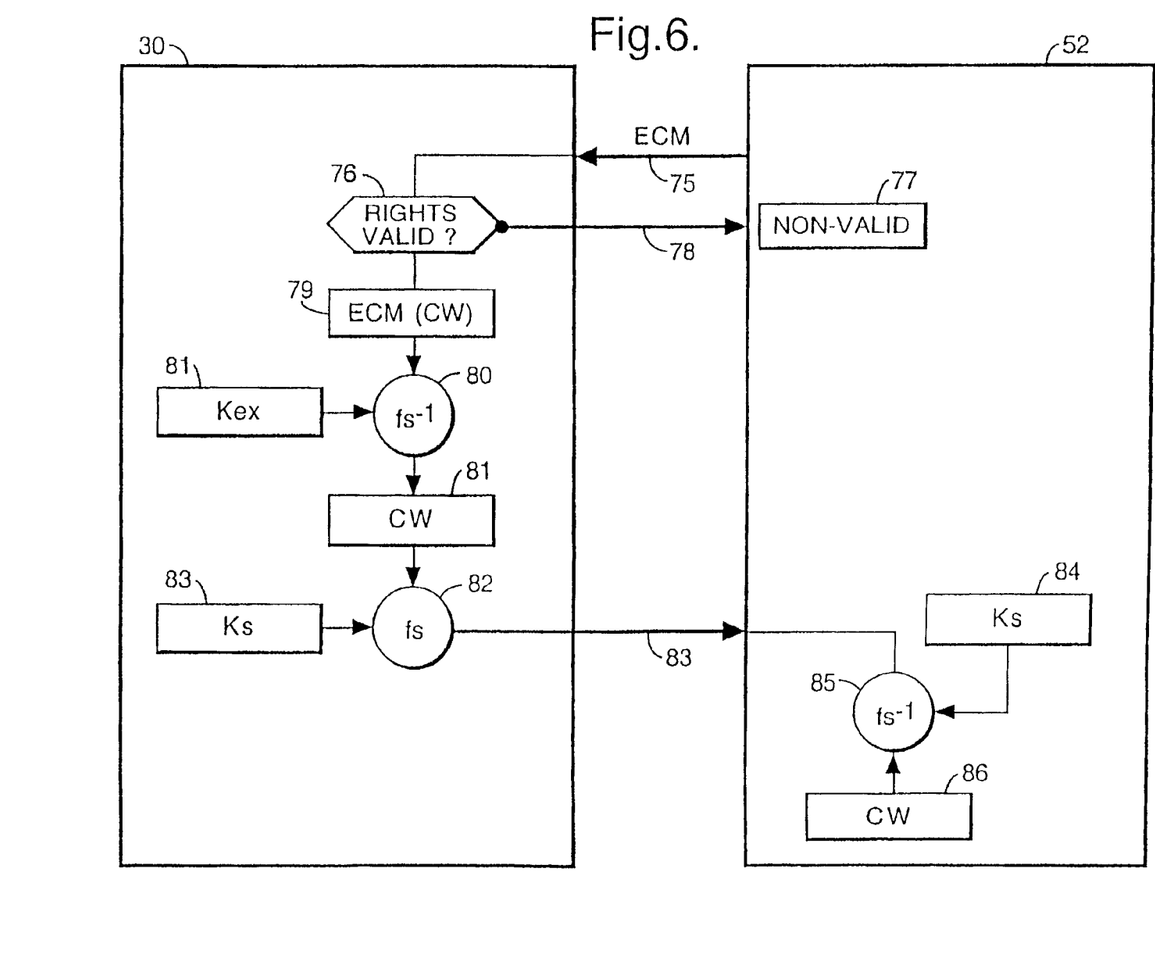
FIG. 6 shows the operation of the first and second decoder in transferring control word information via the secure communication link.

Turning now to FIG. 6, the steps involved in the secure communication of control word information from the card 30 to the card 52 will now be described.

In normal operation, the slave decoder 50 and card 52 receive a scrambled transmission together with the encrypted ECM messages containing the control word information necessary to descramble the transmission. These ECM messages are passed at 75 via the IEEE 1394 link to the master decoder and card 12, 30. Alternatively, the ECM messages for a transmission that will be displayed via the slave decoder may be received directly by the master decoder and card 12, 30.

The card 30 then carries out at 76 a standard verification step to check that one or both of the decoders have the rights to access this transmission. In the event that the decoders do not have the necessary rights the "non-valid" message 77 is returned to the decoder and card 50, 52 and the process stops.

Assuming the subscriber possesses the necessary rights, the ECM message shown at 79 and containing the encrypted control word CW is then decrypted at 80 using the monthly exploitation key Kex shown at 81 associated with the system manager or operator.

The clear value of the control word shown at 81 is then re-encrypted at 82 using the previously obtained session key Ks shown at 83. As will be understood, the encryption algorithm used at 82 for the re-encryption of the control word need not correspond to that used at 80 and, indeed, for security reasons a different algorithm may be used. Conveniently, a custom algorithm proprietary to the system manager may be used for steps relating to the exploitation key Kex including the decryption step shown at 80 and a generic algorithm such as DES used for the encryption of session messages shown at 80.

In some cases, additional information, such as copyright notification information may be introduced between the steps 81 and 82, such that the control word CW and this additional information are encrypted by Ks and sent to the second decoder and card. The presence of such information is more important in cases where the second decoder is capable of recording the data or of passing the information to a recorder. The copyright notification may be used as a flag to prevent the second decoder from recording the data or from recording and playing back the data an infinite number of times, for example.

The encrypted control word is returned to the decoder 50 and card 52 as shown at 83. Using the equivalent session key Ks shown at 84, the card decrypts the message at 85 to obtain the control word in clear shown at 86. Thereafter, this control word value is used by the decoder and card 50, 52 to descramble the associated section of a transmission for subsequent display on the associated television display 55.

In some cases, it may be envisaged that the decoder 50 and card 52 may wish to pass information to another audiovisual device, such as a VCR. In such an example, the decoder 50 and card 52 may be supplied with the necessary private keys to assume the role of a "master" device and the same operations carried out, mutatis mutandis, between the decoder and the other device to set up a secure link.

Whilst the above description has focused on the validation and communication of information in relation to a pair of decoders, the invention may equally expanded to cover a series of interconnected decoders, for example, a single master decoder possessing a plurality of private transport keys KpriT for decryption of messages from a plurality of dependent decoders each possessing its equivalent public key KpubT.

Furthermore, whilst the data communicated from the decoder to the recorder comprises the control word in the described example other information may be passed via this link, even including information not related directly to descrambling a transmission.

Equally, the same principles as set out above may be applied to communications between other digital audiovisual devices connected in a network, such as digital VCRs, digital televisions or any combination of such devices. For example, referring to FIG. 7, the elements of an access control system for recordal and replaying of scrambled transmission will now be described.

Decoder and Recorder Configuration

Figure 7:
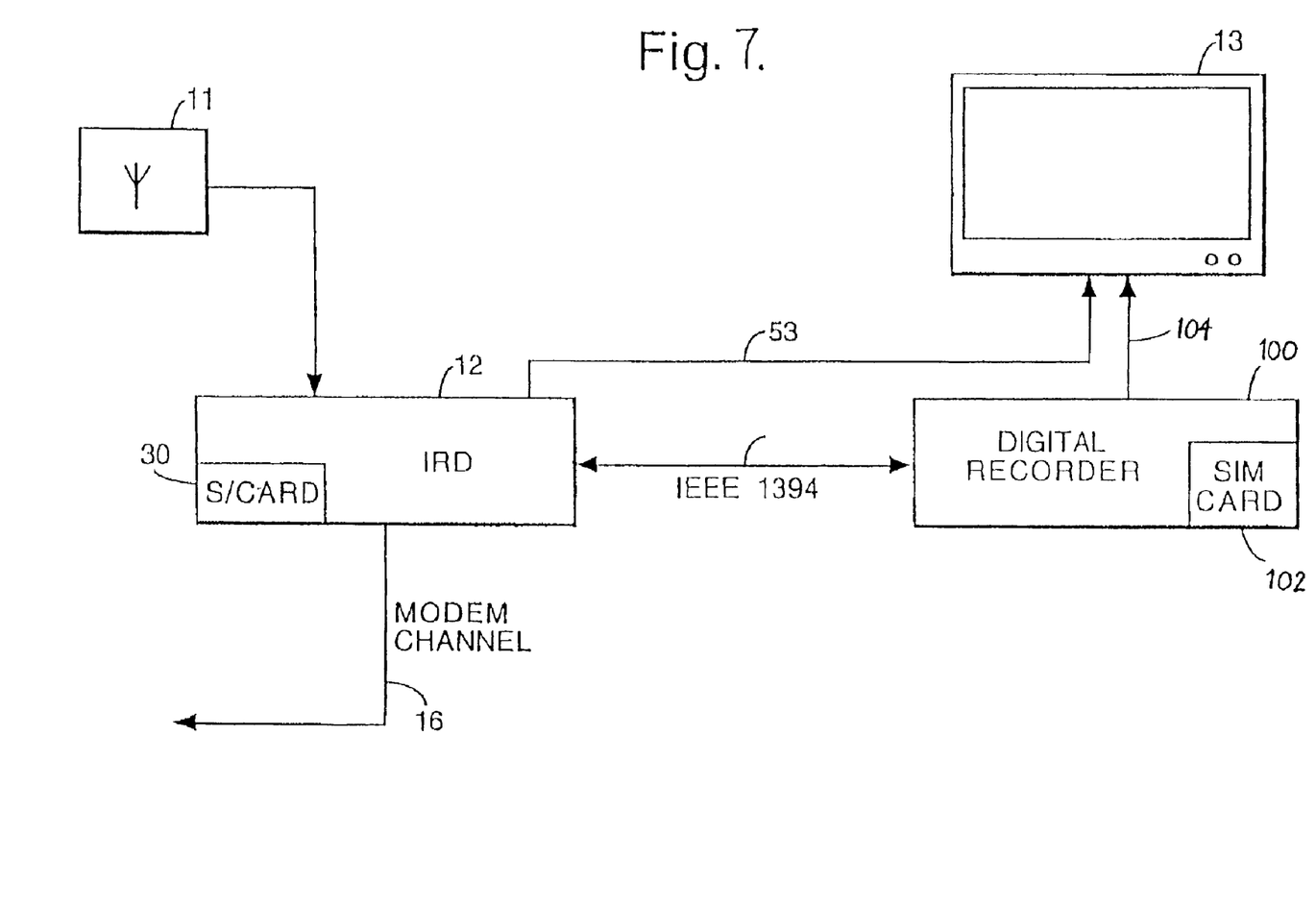
FIG. 7 shows the layout of a decoder and digital recording device.

As before, a decoder 12 receives scrambled broadcast transmissions via a receiver 11. The decoder includes a portable security module 30, which may conveniently take the form of a smart card, but which may comprise any other suitable memory or microprocessor device. The decoder 12 includes a modem channel 16, for example, for communicating with servers handling conditional access information and is also adapted to pass descrambled audiovisual display information, e.g. via a Peritel link 53, to a television 13. The system additionally includes a digital recorder 100, such as a DVHS or DVD recorder, adapted to communicate with the decoder, for example, via an EEE 1394 bus 101. The recorder 100 receives a digital recording support (not shown) on which information is recorded.

The recorder 100 is further adapted to function with a portable security module 102 containing, inter alia, the keys used to control access to the replaying of a recording. The portable security module may comprise any portable memory and/or microprocessor device as is conventionally known, such as a smart card, a PCMCIA card, a microprocessor key etc. In the present case, the portable security module 102 has been designated as a SIM card, as is known from the field of portable telephones.

The digital recorder 100 includes a direct link 104 to the display 13. In alternative realisations, digital audiovisual information may be passed from the recorder 100 to the decoder 12 prior to display. Equally, whilst the elements of decoder 12, recorder 100 and display 13 have been indicated separately, it is conceivable that some or all of these elements may be merged, for example, to provide a combined decoder/television set or combined decoder/recorder etc.

Similarly, whilst the invention will be discussed in relation to the recording of audiovisual broadcast information, it may also conveniently be applied, for example, to broadcast exclusive audio information subsequently recorded on a DAT or minidisc recorder or even a broadcast software application recorded on the hard disc of a computer.

Secure Communication between Decoder and Recorder

As set out in the introduction, it is known from prior art proposed systems to re-encrypt the control word associated with a scrambled transmission with a recording key and to store the re-encrypted control word on the recording support with the scrambled transmission. Unlike the exploitation key associated with encryption and decryption of the original transmission, the recording key may be an unchanging key associated with this particular recording so as to enable the recording to be played back at any time in the future.

As will be seen from the overview of FIG. 7, in order to enable independence of the recording elements of the system from the decoder elements, it is necessary that the recording key be associated with the recorder 100, for example, by storing the key in a security module associated with the recorder such as the portable security module SIM card 102. Otherwise, if the key is permanently stored at decoder 12 or smart card 30 it will not be possible for a recorder to play back a recording in the absence of the decoder.

In order to do this it will be necessary to pass certain information between the decoder 12 and the recorder 100 along the link 101. This information may be, for example, decrypted control word information that may be then re-encrypted by use of a recording key at the digital recorder. Alternatively, control word information may be encrypted by a recording key generated by the decoder, this recording key then being sent to the recorder for storage.

In all cases it is necessary to ensure a securised link between the decoder and recorder. Unfortunately, the independence of activities between a broadcast system manager responsible for the decoder and a manufacturer of recording equipment responsible for the recorder may lead to a number of problems regarding the provision of encryption keys for this purpose.

For example, a broadcast operator may not place sufficient confidence in the integrity of security at the manufacturing site of a recorder to entrust the manufacturer with, for example, a secret symmetric algorithm key needed by the recorder security module 102 to decrypt communications encrypted using the equivalent key held by the decoder security module 30.

Furthermore, the separation of activities may make it impractical to envisage a situation in which the recorder security module 102 is sent to a broadcast system manager for personalisation with the appropriate keys. For this reason, it is necessary to envisage a solution which allows the greatest independence of operation for the decoder and recorder.

Figure 8:
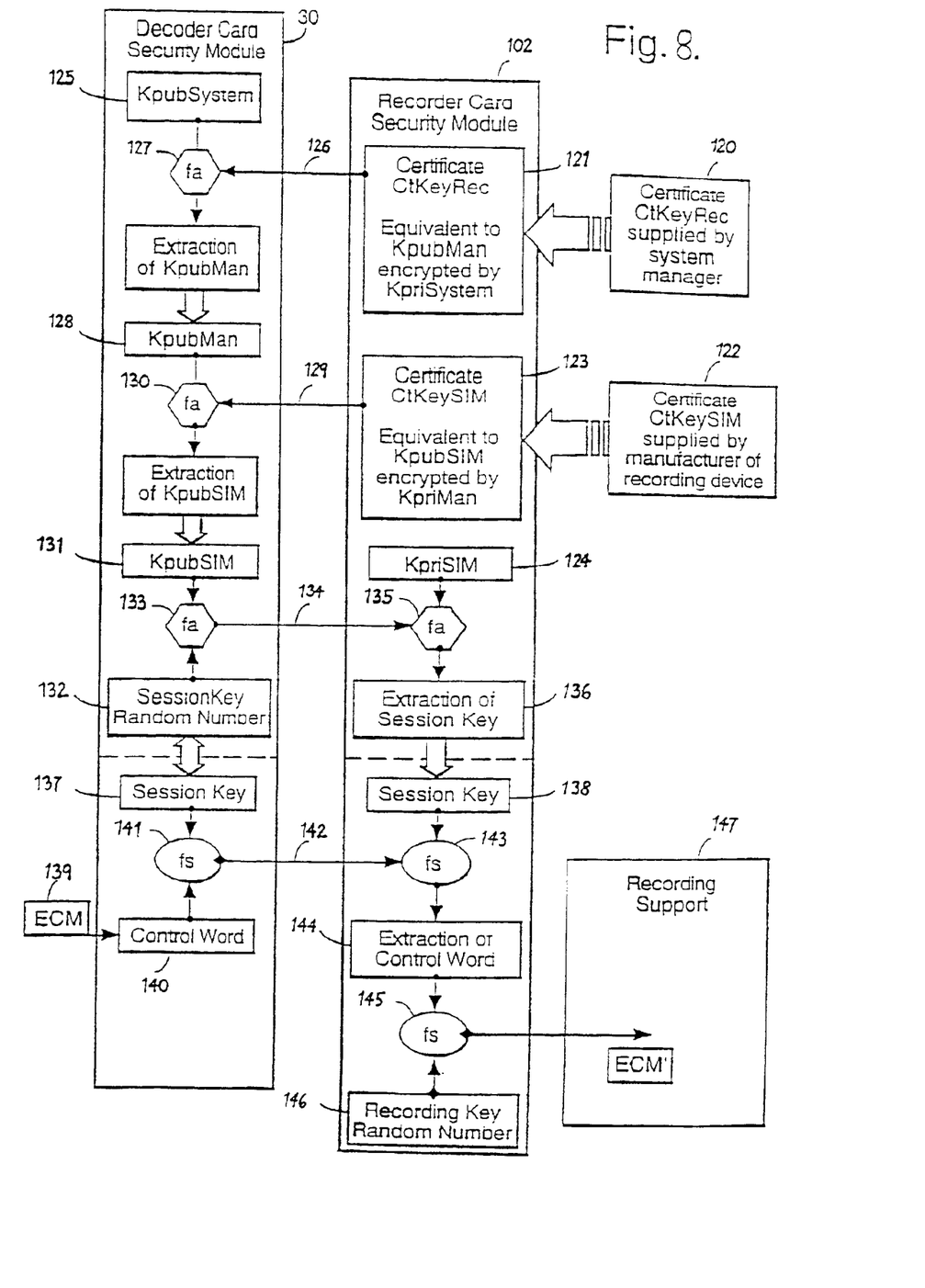
FIG. 8 shows the steps associated with the personalisation of decoder and recorder security modules and with the subsequent operations carried out to set up a secure communication link between the devices.

FIG. 8 shows in schematic form a method of setting up a secure communication link between the decoder and recorder security modules 30, 102 that overcomes these problems.

For the sake of clarity, all encryption/decryption operations using a public/private key algorithm are indicated by means of the symbol $f_a$ in a hexagon, whilst all operations using a symmetric algorithm are indicated by the symbol $f_s$ in an oval.

As shown in FIG. 5, the recorder card 102 is prepared by the recorder manufacturer using a system certificate CtKeyRec shown at 120 that is communicated to the recorder manufacturer by the broadcast system manager. As is shown at 121, this certificate corresponds to a manufacturer public key KpubMan encrypted by a broadcaster system private key KpriSystem. The private key KpriSystem is unique to and held exclusively by the system manager and it is not possible to derive this key value from the certificate CtKeyRec even if the value KpubMan is known.

As will become clearer from the description below, the system certificate CtKeyRec which includes the manufacturer key KpubMan serves as a guarantee by the broadcast operator of the integrity of the security of the key system of the manufacturer and, notably, the validity of the key KpubMan. The certificate is generated once only. In this certifying operation, the manufacturer communicates the key KpubMan to the broadcast system manager, who encrypts the key KpubMan using the private key KpriSystem and returns the system certificate CtKeyRec. Thereafter, the manufacturer configures all recorder security modules to include the certificate CtKeyRec during the personalisation step of the recorder security modules.

The key KpubMan itself corresponds to a public key of a private/public key pair associated with the identity of and unique to the recorder manufacturer or source of the recorder. The corresponding private key KpriMan is held exclusively by the recorder manufacturer and is not known even to the broadcast system manager. The key KpriMan is itself used to generate a device certificate CtKeySIM shown at 122. This certificate, which is unique to the recorder security module, corresponds to a recorder security module key KpubSIM encrypted by the private manufacturer key KpriMan.

The key KpubSIM equally corresponds to a public key of a private/public key pair associated with the identity of and unique to the recorder device. This key and the corresponding private key KpriSIM are generated by the recorder manufacturer. As shown, the private key KpriSIM is stored in the recorder security module at 124, preferably at the moment of manufacture of the chip itself.

In the event that an encrypted communication is to be set up between the decoder and the recorder, for example, associated with the recording of a transmission received by the decoder, the system certificate CtKeyRec is transmitted from the recorder security module 102 to the decoder security module 30 as shown at 126.

The decoder security module 30 includes the broadcast system public key KpubSystem shown at 125 and stored in the card 30 during personalisation by the broadcast system manager. Using the system key KpubSystem, the decoder security module decrypts at 127 the certificate CtKeyRec in order to obtain the manufacturer public key KpubMan.

In the case of a security breach associated with the recorder source, the security module 30 can be programmed to reject certain manufacturer public key values obtained after the decryption step 127. Otherwise, the key KpubMan is stored at 128 and will be used in the next decryption steps.

As shown at 129, the recorder security module 102 then communicates the device certificate CtKeySIM, unique to that recorder security module, to the decoder security module 30. Using the manufacturer public key KpubMan, the decoder security module 30 decrypts at 130 the recorder security module public key KpubSIM.

This public key is stored at 131 in the decoder security module 30 and is then used in the encryption and communication of a session key value. This session key value, which in this example corresponds to a random number value usable by a symmetric encryption/decryption algorithm, is generated at 132, encrypted at 133 by the recorder security module public key KpubSIM and then communicated to the recorder security module at 134.

As will be understood, in view of the nature of public/private key algorithms, this encrypted message may only be decrypted using the unique private key KpriSIM stored at 124 in the recorder security module. Decryption of the message at 135 leads to the extraction of the session key at 136.

Thereafter, each security module 30, 102 will possess a copy of the symmetric session key at 137, 138 for use in encryption and decryption of bi-directional messages. As mentioned above, the session key is used in combination with a symmetric algorithm and equal security is provided for messages in either direction. Other embodiments not requiring bi-directional communication and using an asymmetric algorithm may be envisaged.

As shown in FIG. 8, the session key is used in this embodiment to communicate control word information from the decoder to the recorder. In particular, an ECM message 139 associated with the scrambled transmission is received and decrypted by the decoder security module to obtain the clear value of the control word 140 together with any other information contained therein. This control word is then re-encrypted at 141 using the session key stored at 137, and the resulting encrypted message communicated at 142 to the recorder security module 102.

Using the session key stored at 138, the recorder security module decrypts the message at 143 to obtain the clear value of the control word at 144. The control word is then re-encrypted at 145 using a recording key generated internally by the recorder security module and stored at 146. The new ECM comprising this re-encrypted control word and any other information is then recorded on the recording support 147 together with the originally scrambled transmission. Upon playback of the recording, the recorder security module 102 will use the recording key value stored at 146 to decrypt the ECM so as to obtain the control word value to be used in decrypting the scrambled transmission prior to display.

In order to provide a safeguard copy, the recording key may be communicated to the decoder using the session key. The recording is thereafter stored in the decoder security module as a backup in the event of damage or loss of the recorder security module.

The private/public keys pairs KpriSIM, KpubSIM, KpriMan, KpubMan, KpriSystem and KpubSystem may be generated in accordance with any suitable asymmetric encryption algorithm such as RSA or Diffie-Hellman. Equally, the session key and recording key may correspond to key values usable with any suitable symmetric encryption/decryption algorithm such as DES.

As will be understood, alternative realisations of the above embodiment are possible. In the case, for example, where the same system manager is responsible for personalising managing both decoder and recorder security modules, the initial step of authentification using the system certificate CtKeyRec may be omitted, such that the value of KpubMan is directly inserted in the decoder module at 128.

Furthermore, in the case where the responsibility to ensure integrity of security of transmitted and recorded emissions rests with the manufacturer of the recorder, some or all of the roles of the decoder security module and recorder security module may be completely reversed, such that the recorder manufacturer certifies a public key provided by the broadcast system operator, the recorder is responsible for initiation of communication, generation of a session key etc.

It will also be appreciated that, below the level of the generation of a session key, any number of possibilities for communication of information for use in recording may be envisaged. For example, whilst the data communicated from the decoder to the recorder comprises the control word in the described example it may be envisaged to decrypt and re-encrypt audiovisual data itself before communication to the recorder card. Alternatively, or in addition, the recording key may be generated at the decoder security module and communicated to the recorder security module.

Finally, whilst the above description has focused on the validation and communication of information in relation to single sources of recorders or decoders, the invention may equally expanded to cover multiple decoder and/or recorder sources. For example, a recorder security module may include a plurality of system certificates CtKeyRec associated with a plurality of broadcast system managers. Equally a decoder security module may be adapted to handle a plurality of recorder manufacturer management keys KpubMan obtained after the first verification step is carried out.

Whilst the use of a changing session key increases the level of security, other realisations can be envisaged where a constant session key is used or where the public/private keys KpubSIM/KpriSIM are used to directly encrypt information communicated from the one device to the other device. The session key may itself comprise a private/public key pair.

What is claimed is:

1. A method of providing secure communication of information between at least a first and second digital audiovisual device and characterised in that the second device receives a certificate comprising a transport public key encrypted by a management private key, the second device decrypting the certificate using an equivalent management public key and thereafter using the transport public key to encrypt information sent to the first device, the first device using an equivalent private key to decrypt the information.

2. A method as claimed in claim 1 in which the transport private/public key pair are uniquely associated with the first and second device.

3. A method as claimed in claim 1 in which the encrypted information sent by the second device comprises a session key.

4. A method as claimed in claim 3 in which the session key is a key generated by the second device and usable in conjunction with a symmetric encryption algorithm.

5. A method as claimed in claim 3 in which the session key is used by the first device to encrypt control word information subsequently communicated to the second device.

6. A method as claimed in claim 5 in which the second device decrypts the control word information using the equivalent session key and thereafter descrambles the section of a scrambled transmission associated with this control word.

7. A method as claimed in claim 1 in which the first and second devices comprise a respective first and second portable security module.

8. A method as claimed in claim 1 in which the second device receives a system certificate comprising the management public key encrypted by a system private key, the second device decrypting the system certificate using a system public key so as to obtain the management public key used thereafter to decrypt the encrypted transport public key.

9. A method as claimed in claim 1 in which the communication link between the first and second devices is implemented by a bus connection.

10. A method as claimed in claim 1 in which the first and second digital audiovisual devices comprise a first and second decoder.

11. A method as claimed in claim 10 in which the first and second decoders are adapted to receive digital television transmissions.

12. A method as claimed in claim 1 in which the first and second digital audiovisual devices comprise a decoder device and a recorder device.

13. A method of providing secure communication of information between a decoder device and a recorder device and characterised in that a first one of the devices communicates to the second device a certificate comprising a device public key encrypted by a management private key, the second device decrypting the certificate using an equivalent management public key and thereafter using the device public key to encrypt information sent to the first device, the first device using an equivalent device private key to decrypt the information.

14. A method as claimed in claim 13 in which the first device communicates to the second device a system certificate comprising the management public key encrypted by a system private key, the second device decrypting the system certificate using a system public key so as to obtain the management public key used thereafter to decrypt the device certificate.

15. A method as claimed in claim 13 in which the device private/public key pair are uniquely associated with the identity of the first device.

16. A method as claimed in claim 13 in which the management private/public key pair are uniquely associated with the source of the first device.

17. A method as claimed in claim 14 in which the system private/public key pair are uniquely associated with the source of the second device.

18. A method as claimed in claim 13 in which the encrypted information sent by the second device comprises a session key.

19. A method as claimed in claim 18 in which the session key is a key generated by the second device and usable in conjunction with a symmetric encryption algorithm.

20. A method as claimed in claim 18 in which the session key is used by the decoder device to encrypt control word information subsequently communicated to the recorder device.

21. A method as claimed in claim 20 in which the recorder device may decrypt the control word information using the equivalent session key and thereafter re-encrypt the control word information using a recording encryption key, the re-encrypted control word information being stored by the recorder device on a recording support medium together with the scrambled transmission data associated with that control word information.

22. A method as claimed in claim 21 in which the recorder device communicates to the decoder device a copy of the recording encryption key.

23. A method as claimed in claim 22 in which the recorder device communicates a copy of the recording encryption key as encrypted by the session key.

24. A method as claimed in claim 13 in which at least one of the recorder device and decoder device comprises at least one portable security module.

25. A method as claimed in claim 13 in which the first device corresponds to a recorder device and the second device to a decoder device.

26. A method as claimed in claim 13 in which the decoder device is adapted to receive a digital television transmission.

27. A method as claimed in claim 3 in which the session key is a key generated by the second device and usable in conjunction with an asymmetric encryption algorithm.

28. A method as claimed in claim 3 in which the session key is used by the first device to encrypt data subsequently communicated to the second device.

29. A method as claimed in claim 28 which the session key is used by the second device to decrypt the encrypted data.

30. A method as claimed in claim 18 in which the session key is a key generated by the second device and usable in conjunction with an asymmetric encryption algorithm.

31. A method as claimed in claim 18 in which the session key is used by the decoder device to encrypt data subsequently communicated to the recorder device.

32. A method as claimed in claim 31 in which the session key is used by the recorder device to decrypt the encrypted data.

33. A combination comprising a first and a second digital audiovisual device, wherein the second device is adapted to receive a certificate comprising a transport public key encrypted by a management private key, to decrypt the certificate using an equivalent management public key and thereafter to use the transport public key to encrypt information to be sent to the first device, the first device being adapted to use an equivalent private key to decrypt the information.

34. A combination as claimed in claim 33 wherein the second device is adapted to use the transport public key to encrypt a session key to be sent to the first device.

35. A combination as claimed in claim 34 in which the session key is a key usable in conjunction with a symmetric encryption algorithm.

36. A combination as claimed in claim 34 in which the session key is a key usable in conjunction with an asymmetric encryption algorithm.

37. A combination as claimed in claim 34 in which the first device is adapted to use the session key to encrypt data to be subsequently communicated to the second device.

38. A combination as claimed in claim 37 in which the second device is adapted to use the session key to decrypt the encrypted data.

39. A combination as claimed claim 33, wherein one of said first and second devices is a portable security module.

40. A combination comprising a decoder device and a recorder device, wherein a first one of the devices is adapted to communicate to the second device a certificate comprising a device public key encrypted by a management private key, the second device being adapted to decrypt the certificate using an equivalent management public key and thereafter to use the device public key to encrypt information sent to the first device, the first device being adapted to use an equivalent device private key to decrypt the information.

41. A combination as claimed in claim 40 wherein the second device is adapted to use the device public key to encrypt a session key to be sent to the first device.

42. A combination as claimed in claim 41 in which the session key is a key usable in conjunction with a symmetric encryption algorithm.

43. A combination as claimed in claim 41 in which the session key is a key usable in conjunction with an asymmetric encryption algorithm.

44. A combination as claimed in claim 42 in which the first device is adapted to use the session key to encrypt data to be subsequently communicated to the second device.

45. A combination as claimed in claim 44 which the second device is adapted to use the session key to decrypt the encrypted data.

46. A method as claimed in claim 4 in which the session key is used by the first device to encrypt data subsequently communicated to the second device.

47. A method as claimed in claim 27 in which the session key is used by the first device to encrypt data subsequently communicated to the second device.

48. A method as claimed in claim 19 in which the session key is used by the decoder device to encrypt data subsequently communicated to the recorder device.

49. A method as claimed in claim 30 in which the session key is used by the decoder device to encrypt data subsequently communicated to the recorder device.

50. A combination as claimed in claim 43 in which the first device is adapted to use the session key to encrypt data to be subsequently communicated to the second device.

51. A combination as claimed in claim 50 in which the second device is adapted to use the session key to decrypt the encrypted data.

* * * * *